(12) United States Patent
Mardikar et al.

(10) Patent No.: US 8,429,730 B2
(45) Date of Patent: *Apr. 23, 2013

(54) AUTHENTICATING USERS AND ON-LINE SITES

(75) Inventors: Upendra Mardikar, San Jose, CA (US); Mark A. Biggar, Sunnyvale, CA (US)

(73) Assignee: Ebay Inc., San Jose, CA (US)

( * ) Notice: Subject to any disclaimer, the term of this patent is extended or adjusted under 35 U.S.C. 154(b) by 577 days.

This patent is subject to a terminal disclaimer.

(21) Appl. No.: 12/415,884

(22) Filed: Mar. 31, 2009

(65) Prior Publication Data

US 2009/0307765 A1    Dec. 10, 2009

Related U.S. Application Data

(60) Provisional application No. 61/059,409, filed on Jun. 6, 2008.

(51) Int. Cl.
*H04L 9/32*    (2006.01)

(52) U.S. Cl.
USPC ............ 726/7; 726/2; 726/3; 726/4; 726/5; 726/6; 713/168; 713/169; 713/170; 713/182; 713/183; 713/184; 713/185

(58) Field of Classification Search .......... 713/168–170, 713/182–185; 726/2–7
See application file for complete search history.

(56) References Cited

U.S. PATENT DOCUMENTS

| | | | | |
|---|---|---|---|---|
| 2005/0021982 A1* | 1/2005 | Popp et al. | ................... | 713/184 |
| 2005/0268100 A1* | 12/2005 | Gasparini et al. | ............. | 713/170 |
| 2007/0162961 A1* | 7/2007 | Tarrance et al. | .................. | 726/5 |
| 2009/0172775 A1* | 7/2009 | Mardikar et al. | ................. | 726/2 |
| 2009/0199272 A1* | 8/2009 | Gopalakrishna | .................. | 726/3 |
| 2009/0271854 A1* | 10/2009 | Hazlehurst et al. | ............... | 726/7 |

OTHER PUBLICATIONS

Bruce Schneier, Security Skins, http:// www.schneier.com/blog/archives/2005/07/security_skins.html, 2005.*
Jim Youll, Fraud Vulnerabilities in SiteKey Security at Bank of America, Review draft to bank of America/ RSA: Jun. 26, 2006.*

* cited by examiner

*Primary Examiner* — Philip Chea
*Assistant Examiner* — Shanto M Abedin
(74) *Attorney, Agent, or Firm* — Haynes and Boone, LLP (57) ABSTRACT

A method and system enables a user and/or an on-line site to be authenticated by comparing a received password with an expected password, transmitting a new password if the received and expected passwords match, and authenticating a communication if the new password matches what is expected by the on-line site. The initially received password may be distorted, such as with CAPTCHA.

17 Claims, 5 Drawing Sheets

AUTHENTICATING USERS AND ON-LINE SITES

RELATED APPLICATIONS

This application relates to and claims priority to U.S. Provisional Application Ser. No. 61/1059,409, filed Jun. 6, 2008, which is incorporated by reference in its entirely.

BACKGROUND

1. Field of Invention

The present invention relates to Internet security, and in particular, to authenticating users on-line.

2. Related Art

With increased computer use, Internet security is an ever-increasing problem and concern. Areas where Internet security is important include financial transactions between parties, exchange of personal information such as date of birth, social security number, and mother's maiden name, and exchange of financial information such as credit card account numbers, bank account numbers, and other financial institution information. There are many ways to obtain sensitive information fraudulently or to perform a fraudulent transaction over the Internet. One example is through the use of automated software responding to inquiries or requesting information through the Internet. The software may be able to obtain certain sensitive information through the exchange. Computer software has been developed that can mimic human actions, resulting in problems such as quality of service degradation, spamming, and automated posting to blogs and forums.

CAPTCHA (an acronym for "Completely Automated Public Turing test to tell Computers and Humans Apart") is a commonly used security measure to determine whether a recipient is human or a computer. CAPTCHA is a well-known method to determine whether a response is generated by a computer or a human. CAPTCHA displays a distorted image of a sequence of letters and/or numbers. A user entering the correct sequence of letters and/or numbers is determined to be human, as computers are generally unable to reproduce the sequence. Details of CAPTCHA are well known.

One way to defeat CAPTCHA is to use cheap human labor to process and respond to the tests'. Thus, while CAPTCHA may be effective in distinguishing between humans and machines, it cannot determine whether a human user is an authorized user.

Therefore, there is a need for an improved CAPTCHA that distinguishes between a human and a computer, as well as whether a human is an authorized user.

SUMMARY

According to one aspect, authorized users are provided a token to generate passwords. Such tokens are well known, such as the 2FA token from PayPal or tokens from Safeword. In a first step, the user logs on to the desired site. The site generates a password based on the user login and displays a distorted image of the password, e.g., CAPTCHA. The user then compares the displayed image with the password generated from the user's token. If the image and user password match, the user enters the next password generated from the token. The site then compares the entered password with what is expected. If there is a match, the user is authenticated as both human and an authorized user. If there is not a match, the site generates the next password for the user and displays a distorted image of that new password. The user is then required to enter the next password for authentication, assuming the distorted image matches the user's password.

This process prevents capture and replay by computer automated programs and ensures the presence of an authorized user or customer for login, transactions, or other uses. Cross-site request forgery or CSRF attacks can be prevented as well when current CAPTCHAs are broken.

Thus, a CAPTCHA-type security measure is modified and improved such that the site first generates a password for a specific user. The password displayed to the user may or may not be distorted. The user must then verify that the password is correct. This can be from a token or any other suitable medium, such as correspondence from the site or a third party. If the password shown is what the user expects, the user then enters the next password, which again can be from a token or other source. The site compares the entered password with what is expected, and if there is a match, the user is authenticated. Note that entry or conveyance of passwords need not be visual and through a keyboard, but may in some applications be audio or any other suitable means or combination for communicating a password.

These and other features and advantages of the present invention will be more readily apparent from the detailed description of the embodiments set forth below taken in conjunction with the accompanying drawings.

Exemplary embodiments and their advantages are best understood by referring to the detailed description that follows. It should be appreciated that like reference numerals are used to identify like elements illustrated in one or more of the figures, wherein showings therein are for purposes of illustrating exemplary embodiments and not for purposes of limiting the same.

DETAILED DESCRIPTION

Figure 1:
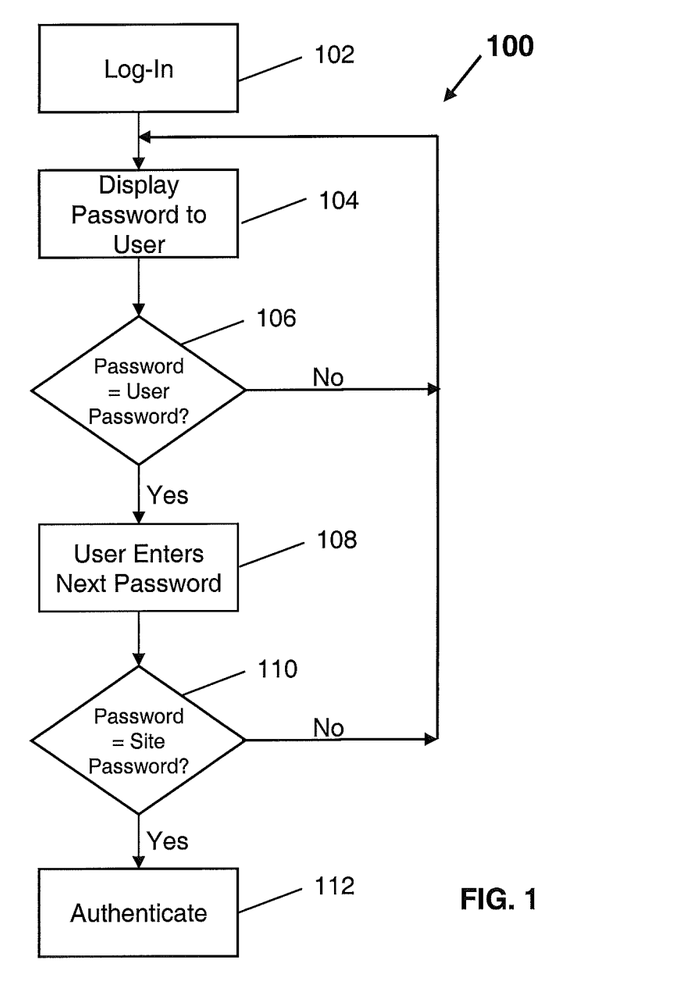
FIG. 1 is a flowchart showing steps to authenticate a user according to one embodiment.

FIG. 1 is a flowchart 100 showing one embodiment of authenticating a user on-line. In step 102, the user logs into the desired on-line site. This can be accomplished through any computing device, such as a desktop, laptop, or mobile device. The site can be any site in which the user has registered a token for password generation. Typical sites include ones that require some level of security for access, such as financial institutions, payment providers like PayPal, Inc., educational institutions, research facilities, accounting firms, technology companies, etc. Password generation tokens and their operation are well known, such as the 2FA token from PayPal, tokens/cards from Safeword, and RSA SecurID. Once successfully logged in, the on-line site, such as through a server, generates or retrieves a password or phrase associated with the particular user. For example, the password may be a series of numbers corresponding to the user's registered token. The password can be a series of letters, numbers, characters, or any combination thereof. Note that the password associated with the user does not need to be generated by a token, but may be based on other methods, such as a look-up table associated with the user.

Figure 2:
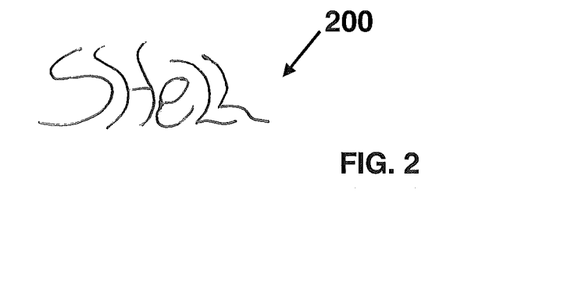
FIG. 2 shows an example of a distorted password.

In step 104, the password is displayed to the user, such as through a screen on a computer or phone. In one embodiment, the password is distorted, like with CAPTCHA, such as shown in FIG. 2. The example in FIG. 2 shows the word "SHELL" distorted. The distortion prevents non-humans from recognizing the password. However, if this is not a concern, the password or phrase does not need to be distorted. Next, at step 106, the user compares the password displayed at step 104 with a password that the user expects. If the displayed password is distorted, such as by CAPTCHA, a machine would not be able to recognize the password and do the comparison with an expected password. The password the user expects may be provided in many different ways. For example, the user's registered token may display the expected password if the displayed password from the on-line site was also generated with a corresponding device. The password may also be provided from a look-up table or from a single known password.

If the password sent from the on-line site matches or is the same as what the user expects (such as matching the password on the user's token), the user enters a next password at step 108. This next password corresponds to what the on-line site expects as the next password. Again, this can be generated or obtained through different methods. One example would be the next password generated from the user's token. Another example would be the next password in a look-up table that both the user and the on-line site has access to. Once the next password is obtained, the user enters it and transmits the password to the on-line site. Entry can be through a keyboard, touchpad, keypad, or any suitable method. Once received by the on-line site, the user entered password is compared, at step 110, with a password that the on-line site is expecting. If the user-entered password does not match the expected password from the on-line site, the user is not authenticated, and on-line site generates another password and repeats the process at step 104. Again, the generated password can be distorted or undistorted.

If the passwords match, as determined at step 110, the on-line site authenticates the user, at step 112, to initiate or continue the transaction or communication. As a result, it can be determined, to a large degree of certainty, that the user at the other end of the communication or transaction is a proper or approved user and is an actual human (e.g., if CAPTCHA is used) and that the on-line site is authentic (as opposed to a fraudulent site). Both parties can then feel confident about initiating or continuing the transaction or communication, with lower risks of fraudulent transactions or misappropriation of sensitive information.

Figure 3:
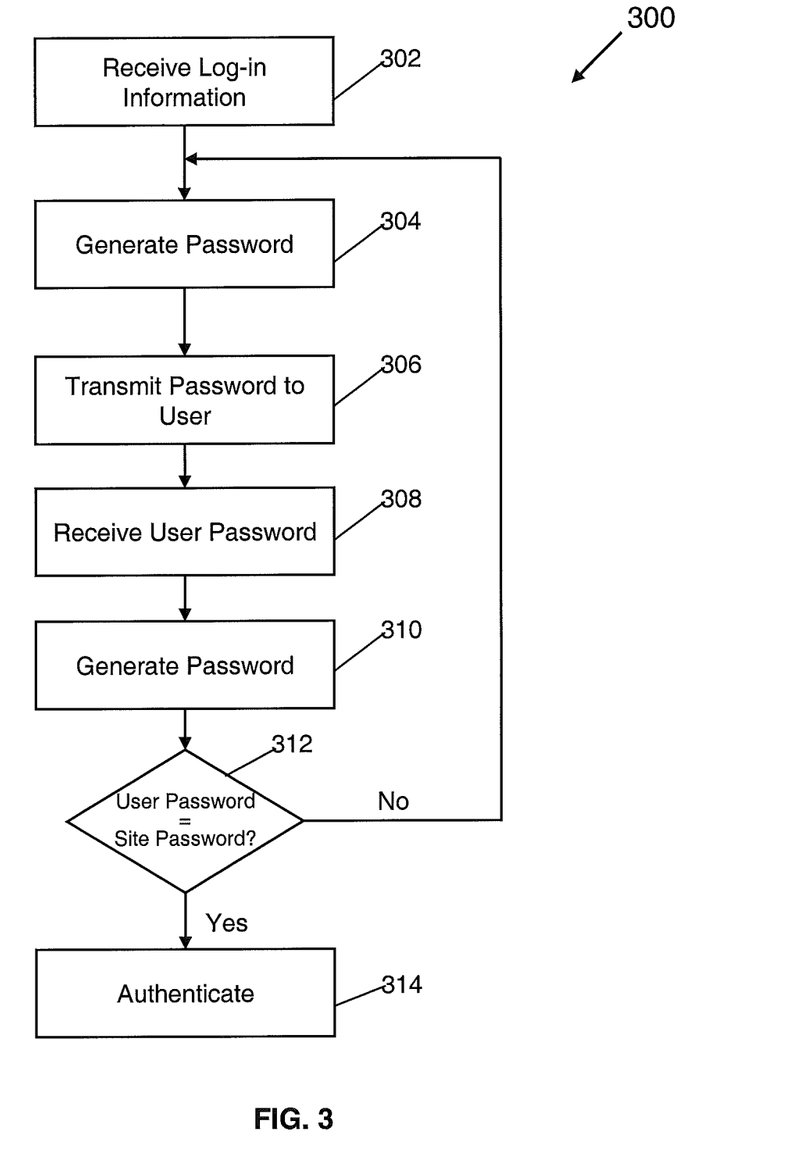
FIG. 3 is a flowchart showing steps for an on-line site to authenticate a user according to one embodiment.

FIG. 3 is a flowchart 300 showing another embodiment of steps for authenticating a user from an on-line site. In step 302, the on-line site receives log-in information from the user. The user first accesses the site, such as through an Internet browser. Once on the site, the user enters log-information, which may include various identifying information, such as an email address, user name, password, phone number, or any combination of such information. If the log-in information is correct, the on-line site generates a password, at step 304, associated with that particular user. The password can be any combination of letters, characters, numbers, etc. and be generated using any conventional means, such as a random number generator synched with the user from SecurID. In one embodiment, the password is distorted, such as like CAPTCHA. Once generated, the on-line site transmits, at step 306, the password to the user, where it is displayed to the user. The display mechanism can be a screen on the user's mobile device, a laptop screen, a desktop screen, or any suitable display associated with a system that enables communication between the user and the on-line site. Examples of such systems include mobile phones, laptop computers, and desktop computers. Transmission of the password can be through the Internet, wirelessly, over a wired-connection, or other transmission medium.

The on-line site then waits for the user to respond to the displayed password. Once the password is displayed to the user, the user checks the displayed password against a local password generated or associated with the user. For example, the user can compare a password from a security token with what is displayed. If the passwords match, which indicates that the on-line site is authentic or what the user intends to communicate with, the user enters another password that the on-line site would expect to receive. In one embodiment, this password is the next password generated or displayed on the user's security token. Any means for generating or retrieving this password may be suitable, as long as the on-line site knows which password to expect if the user is a proper user. Entry of this next password can be through a keyboard (such as with a laptop or desktop computer), a virtual keyboard (such as through an iPhone), a compact or non-conventional keyboard (such as with various mobile devices), or even verbal through a voice connection. After the user enters the password, the password is transmitted or communicated back to the on-line site, where it is received at step 308.

At step 310, the on-line site itself then generates or retrieves the next password it is expecting to receive from an authorized user. If the user is who the on-line site expects from the log in information, the passwords will match. If not, the passwords will likely not match. Thus, at step 312, the on-line site compares the password received from the user (at step 308) with the password generated or retrieved by the on-line site (at step 310). If the passwords match, indicating that the user is who the on-line expects, the on-line site authenticates the user at step 314 to continue or initiate communication or a transaction with the user. However, if at step 312, the passwords are different, then the on-line site generates a new password associated with the user at step 304 and continues the authentication process. Note that each password generated at step 304 must be one that the user would expect from an authentic on-line site or the site the user intended to log into. Once authenticated, the on-line site, as well as the user, has been confirmed as intended parties to the communication.

Figure 4:
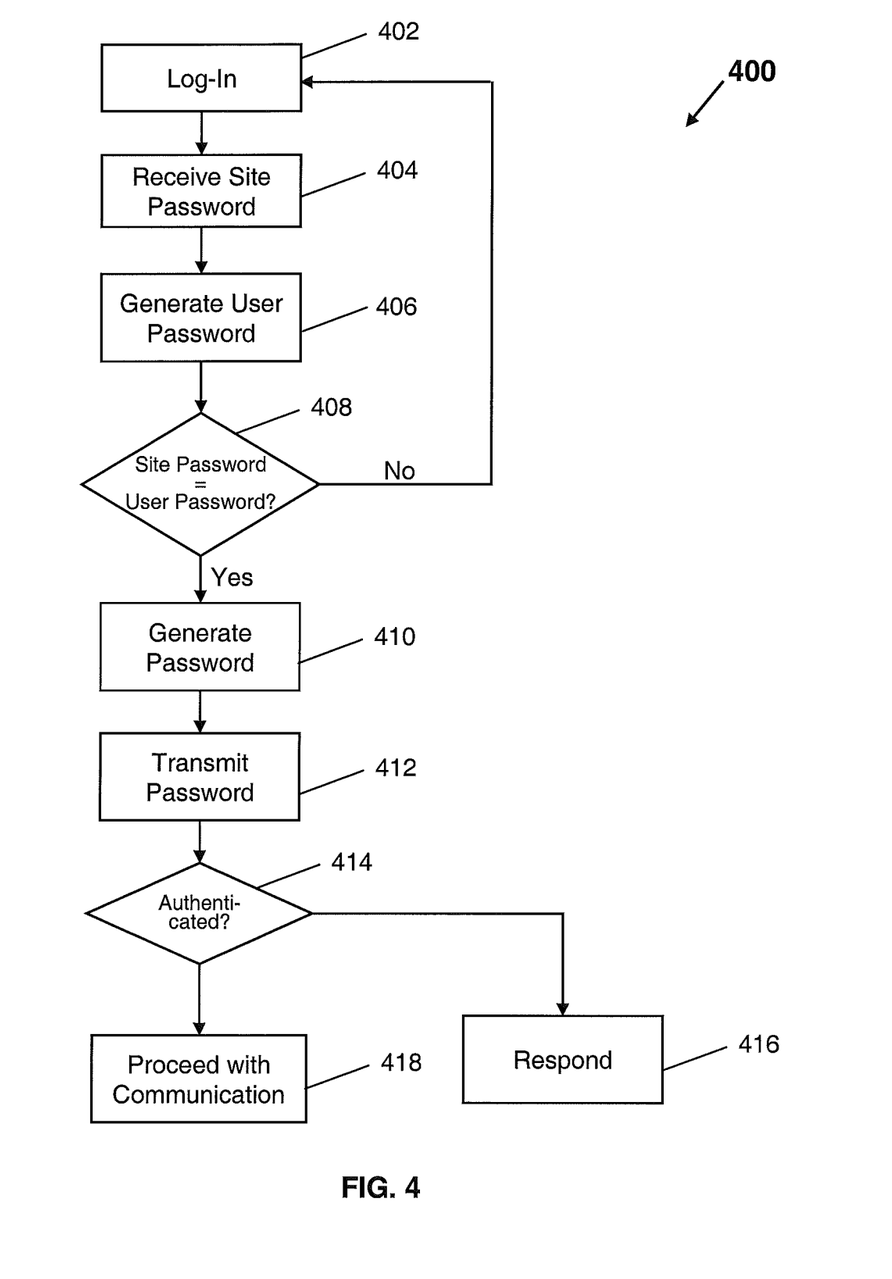
FIG. 4 is a flowchart showing steps for a user to authenticate an on-line site according to one embodiment.

FIG. 4 is a flowchart 400 showing another embodiment with steps for authenticating an on-line site by the user. At step 402, the user logs into the desired on-line site, such as described above. Based on the log-in information, the on-line site generates and transmits a password, which may or may not be distorted. The user receives the password at step 404, which is displayed for the user to see. The user then generates or retrieves a password, at step 406, that the user expects to see if the on-line site is authentic. The user compares, at step 408, the password from step 406 with the one received from the on-line site in step 404. If the passwords do not match, for example indicating that the responding site is fraudulent or one not intended by the user, the user can try and log in again at step 402 to repeat the authentication process.

If the passwords match, indicating the site is the user-intended site, the user generates or retrieves a new password at step 410. That password should be what the on-line site expects. At step 412, the user transmits the password to the on-line site, such as by entering in the password and sending. The user then waits for a response from the on-line site. After receiving the password from the user, the on-line site retrieves or generates a corresponding password and determines whether the received password and the site-generated password match. A match indicates to the on-line site that the user is proper, while a mismatch may indicate the user is not proper or that the user simply entered in a wrong password, such as by mis-typing the password.

Regardless, the on-line site determines that the passwords do not match, the on-line site may send the user a message indicating that the communication or transaction is denied. If that is the case, the user, at step 414, is not authenticated. At this time, the user may have several options for response at step 416. One, the user may try logging into the on-line site again at step 402. This would start the complete process over again, which would be more time consuming, but also possibly more secure. Two, the user may respond to a new password generated and transmitted by the on-line site at step 404. This allows the user to first re-authenticate the site before proceeding with user authentication. Three, the user may generate a new password at step 410. This would be the easiest for the user, with a possible assumption that the user is proper, but simply entered in the wrong password by mistake. If the user is authenticated by the on-line site, then the user is notified and proceeds with the communication or initiates a transaction in step 418.

These series of steps enables both the user and the on-line site to be authenticated. When the user first matches up an expected password with what is received from the on-line site, the user authenticates the on-line site. Next, when the on-line site matches up an expected password with what is received from the user, the on-line site authenticates the user. The result is a higher likelihood that the communication is between intended parties.

Figure 5:
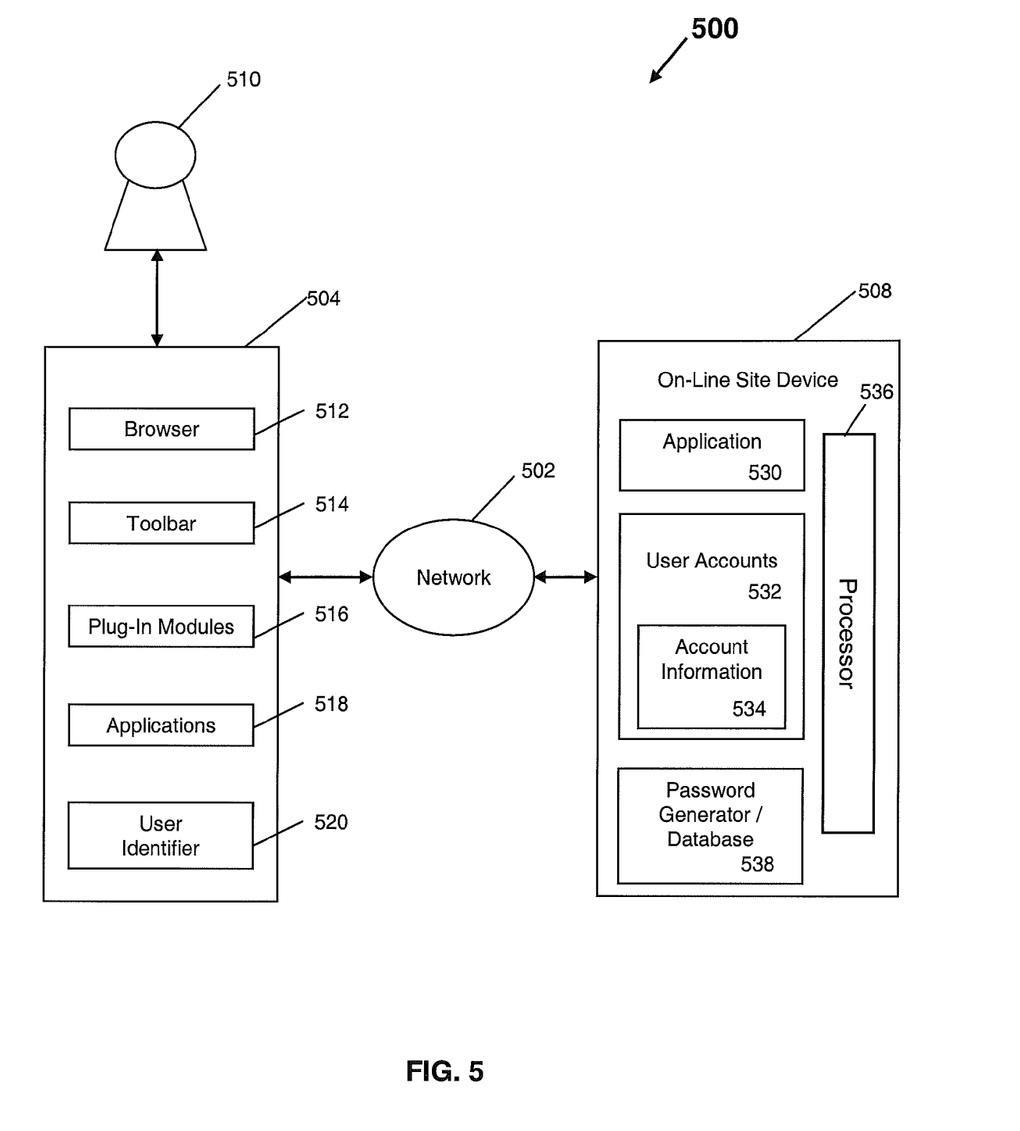
FIG. 5 is a block diagram of a system used for authenticating a user and/or an on-line site according to one embodiment.

FIG. 5 is a block diagram of a system 500 configured to authenticate a user and/or an on-line site for secure communication between intended parties, according to one embodiment. System 500 includes at least one user device 504 and at least one on-line site device 508 in communication over a network 502. Network 502, in one embodiment, may be implemented as a single network or a combination of multiple networks. For example, in various embodiments, network 502 may include the Internet and/or one or more intranets, landline networks, wireless networks, or a wireless telecommunications network (e.g., cellular phone network) adapted to communicate with other communication networks, such as the Internet.

User device 504 may be implemented using any appropriate combination of hardware and/or software configured for wired and/or wireless communication over network 502. For example, user device 504 may be implemented as a personal computer, mobile device such as a cell phone, or a laptop of a user 510 in communication with network 502. User device 504 may include one or more browser applications 512 which may be used, for example, to provide a user interface to permit user 510 to browse information available over network 502. For example, browser application 512 may be implemented as a web browser to view information available over the Internet.

User device 504 may include one or more toolbar applications 514, which may be used, for example, to provide user-side processing for performing tasks in response to operations selected by user 510. For example, toolbar application 514 may display a graphical user interface (GUI) in connection with browser application 512. User device 504 may also include a plug-in module 516 for facilitating financial transactions over network 502. In one implementation, plug-in module 516 comprises a software program, such as a graphical user interface (GUI), executable by a processor that is configured to interface and communicate with on-line site server 508 via network 502. On-line site device 508 may be associated with any suitable on-line site, such for a merchant, retailer, bank, or payment provider, such as PayPal, Inc. of San Jose, Calif., for facilitating on-line financial services, and can be a server, computing device, etc. User 510 is able to access on-line site device 508 to communicate with the desired on-line site via a network browser, such as a web browser.

User device 504 may include other applications 518 as may be desired in particular embodiments to provide additional features available to user 510. For example, such other applications 518 may include security applications for implementing customer-side security features, programmatic customer applications for interfacing with appropriate application programming interfaces (APIs) over network 502 or various other types of generally known programs and/or applications.

User device 504 may include one or more user identifiers 520, which may be implemented, for example, as operating system registry entries, cookies associated with browser application 512, identifiers associated with hardware of user device 504, or various other appropriate identifiers. User identifier 520 may include attributes related to the user, such as personal information (e.g., a user name, password, photograph image, biometric id, address, phone number, etc.) and banking information (e.g., banking institution, credit card issuer, user account numbers, security information, etc.). In various implementations, user identifier 520 may be passed or transmitted as part of the log-in process described above.

As discussed above, on-line site device 508 may be maintained by an on-line payment provider, merchant, or financial institution. Depending on the services provided by the on-line site, the device stores and allows access to specific information. In general, site device 508 includes one or more applications 530 for providing the desired services to user 510 via network 502 and a plurality of user accounts 532. Each user account 532 may include account or authenticating information 534 associated with individual users, such as one or more account numbers, user IDs, passwords, credit card information, banking information, or other types of information associated with the user, which may be used to identify a particular user upon log in. Site device 508 may also include a processor 536 and a password generator/database 538.

Processor 536 communicates with user account 532 and password generator/database 538 to generate/retrieve passwords based on specific user log-in information and compares passwords received from a specific user with expected passwords, as discussed above. Password generator/database 538 may be a synched random number generator, such as provided by RSA SecurID, a look-up table, or any suitable generation or storage/look-up means for passwords associated with specific users. Processor 536 may be any suitable computing means that can compare received passwords with expected passwords for authenticating a user.

Figure 6:
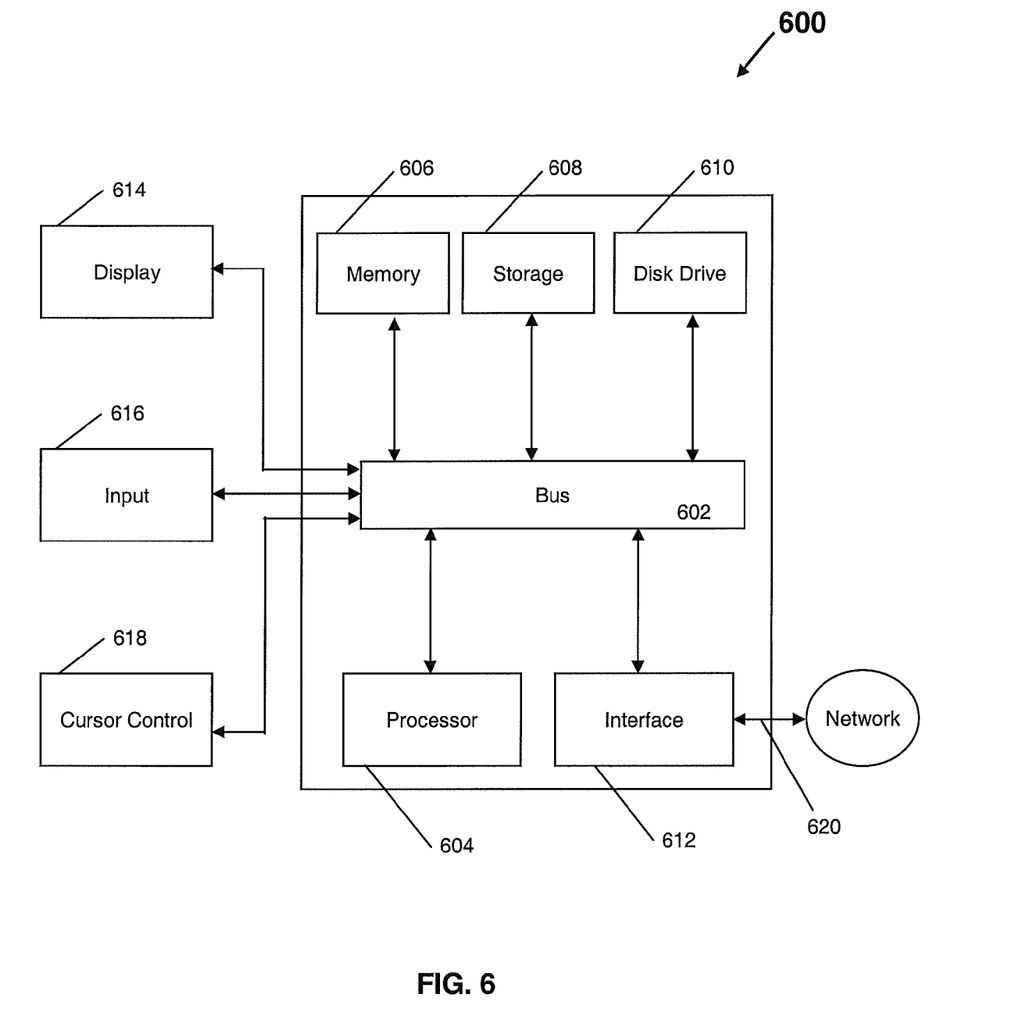
FIG. 6 is a block diagram of one embodiment of a system that can be used to implement one or more components of the system described herein for performing steps described in various embodiments.

FIG. 6 is a block diagram of a computer system 600 according to one embodiment, which may be suitable for implementing embodiments of various aspects of this disclosure. In various implementations of embodiments, device 600 may comprise a personal computing device, such as a personal computer, laptop, PDA, cellular phone or other personal computing or communications devices. In one embodiment, computer system 600 may include a bus 602 or other communication mechanism for communicating information, which interconnects subsystems and components, such as a processing component 604 (e.g., processor, micro-controller, digital signal processor (DSP), etc.), a system memory component 606 (e.g., RAM), a static storage component 608 (e.g., ROM), a disk drive component 610 (e.g., magnetic or optical), a network interface component 612 (e.g., modem or Ethernet card), a display component 614 (e.g., CRT or LCD), an input component 616 (e.g., keyboard or keypad), and/or a cursor control component 618 (e.g., keys, mouse, or trackball). In one embodiment, disk drive component 610 may comprise a database having one or more disk drive components. One or more antennas can be used to transmit and/or receive passwords to and from an on-line site from a user, and vice versa.

Computer system 600 may perform specific operations by processor 604 executing one or more sequences of one or more instructions contained in system memory component 606, according to steps described herein. Such instructions may be read into system memory component 606 from another computer readable medium, such as static storage component 608 or disk drive component 610. The various storage or memory components may be used to store information about users and passwords for authenticating on-line sites and/or users. In other embodiments, hard-wired circuitry may be used in place of or in combination with software instructions to implement the invention.

Logic may be encoded in a computer readable medium, which may refer to any medium that participates in providing instructions to processor 604 for execution. Such a medium may take many forms, including but not limited to, non-volatile media, volatile media, and transmission media. In various implementations, non-volatile media includes optical or magnetic disks, such as disk drive component 610, volatile media includes dynamic memory, such as system memory component 606, and transmission media includes coaxial cables, copper wire, and fiber optics, including wires that comprise bus 602. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various example embodiments, execution of instruction sequences for practicing embodiments of the invention may be performed by computer system 600. In various other embodiments, a plurality of computer systems 600 coupled by communication link 620 may perform instruction sequences to practice the invention in coordination with one another.

Computer system 600 may transmit and receive messages, data, information and instructions, including one or more programs (i.e., application code), passwords, and user information, through communication link 620 and communication interface 612. Received program code may be executed by processor 604 as received and/or stored in disk drive component 610 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure. For example, the method is described with reference to CAPTCHA, but any suitable challenge-response test administered by a computer for a human may also be used, as well as tests where the password generated by the computer is not distorted. In addition, passwords are described as being displayed, but they can be conveyed in any suitable manner, such as by voice. Furthermore, passwords are described as being generated, but they may actually be retrieved or otherwise obtained without an actual generation of passwords.

Having thus described embodiments of the invention, persons of ordinary skill in the art will recognize that changes may be made in form and detail without departing from the scope of the invention. Thus, the invention is limited only by the claims.

What is claimed is:

1. A system of authenticating an on-line communication between a user and an online site, comprising:
    a memory storing information about user accounts, wherein the information comprises log-in information; and
    a processor configured for
    receiving information from the user;
    transmitting an image comprising a first password based on the information;
    receiving a second password from the user, wherein the second password is generated from a token device of the user after the first password has been generated by the token device, is different from the first password, is not part of the image, and is sent from the user only when the first password matches a first expected password by the user, wherein the first password is distorted;
    comparing the second password with a second expected password for the user; and
    authenticating the communication if the second password matches the second expected password.

2. The system of claim 1, wherein the first password is distorted by CAPTCHA.

3. The system of claim 1, wherein the communication is between the user and the on-line site.

4. The system of claim 1, wherein the information is log-in information.

5. The system of claim 1, wherein the processor is further configured for generating the second expected password prior to the comparing.

6. The system of claim 1, wherein the processor is further configured for retrieving the second expected password prior to the comparing.

7. The system of claim 1, wherein the communication comprises an exchange of sensitive information.

8. The system of 1, wherein the transmitting, comparing, and authenticating is by an on-line site.

9. A system for authenticating a user for an on-line communication between the user and an online site, comprising:
   means for receiving information from the user;
   means for transmitting an image comprising a first password based on the information;
   means for receiving a second password from the user, wherein the second password is generated from a token device of the user after the first password has been generated by the token device, is different from the first password, is not part of the image, and is sent from the user only when the first password matches a first expected password by the user, wherein the first password is distorted;
   means for comparing the second password with a second expected password for the user; and
   means for authenticating the communication if the second password matches the second expected password.

10. The system of claim 9, wherein the communication is between the user and the on-line site.

11. The system of claim 9, wherein the information is log-in information.

12. The system of claim 9, wherein the means for receiving information, transmitting the first password, and receiving the second password comprise at least one antenna.

13. The system of claim 9, wherein the means for comparing and the means for authenticating comprise at least one processor.

14. A non-transitory computer-readable medium comprising a plurality of machine-readable instructions which when executed by one or more processors of a server are adapted to cause the server to perform a method of authenticating a communication between a user and an online site comprising:
   receiving log in information from the user;
   generating a first password based on the log in information;
   transmitting an image comprising the first password;
   receiving a second password from the user, wherein the second password is generated from a token device of the user after the first password has been generated by the token device, is different from the first password, is not part of the image, and is sent from the user only when the first password matches a first expected password by the user, wherein the first password is distorted;
   comparing the second password with a second expected password for the user; and
   authenticating the communication if the second password matches the second expected password.

15. The non-transitory computer-readable medium of claim 14, wherein the first password is distorted by CAPTCHA.

16. The non-transitory computer-readable medium of claim 14, wherein the receiving comprises an exchange of sensitive information.

17. The non-transitory computer-readable medium of claim 14, wherein the comparing and authenticating is by the on-line site.

* * * * *